(12) United States Patent
Nangle, III

(10) Patent No.: US 10,311,468 B2
(45) Date of Patent: *Jun. 4, 2019

(54) STATISTICAL MARKETING ATTRIBUTION CORRELATION

(71) Applicant: International Business Machines Corporation, Armonk, NY (US)

(72) Inventor: Paul M. Nangle, III, Clinton, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 115 days.

This patent is subject to a terminal disclaimer.

(21) Appl. No.: 13/729,969

(22) Filed: Dec. 28, 2012

(65) Prior Publication Data

US 2014/0188596 A1    Jul. 3, 2014

(51) Int. Cl.
*G06Q 30/02* (2012.01)

(52) U.S. Cl.
CPC ................. *G06Q 30/0246* (2013.01)

(58) Field of Classification Search
CPC .................................................. G06Q 30/0241
USPC ................................ 705/14.41, 14.45, 14.16
See application file for complete search history.

(56) References Cited

U.S. PATENT DOCUMENTS

| | | | |
|---|---|---|---|
| 6,850,988 B1 | 2/2005 | Reed | |
| 7,991,640 B2 * | 8/2011 | Shapira et al. | 705/7.29 |
| 8,065,296 B1 | 11/2011 | Franz et al. | |
| 8,126,894 B2 | 2/2012 | Liu et al. | |
| 8,140,384 B2 | 3/2012 | Almeida | |
| 8,229,788 B2 * | 7/2012 | Nyhan et al. | 705/14.41 |
| 2005/0027587 A1 * | 2/2005 | Latona et al. | 705/10 |
| 2009/0094196 A1 | 4/2009 | Piwowarski et al. | |

(Continued)

OTHER PUBLICATIONS

Roelof Van Zwol, et al., Ranking Entity Facets Based on User Click Feedback, Proceedings of the 2010 IEEE Fourth International Conference on Semantic Computing, Sep. 2010, pp. 192-199, IEEE Computer Society, Washington, DC, USA.

(Continued)

*Primary Examiner* — Ilana L Spar
*Assistant Examiner* — Robert C Johnson
(74) *Attorney, Agent, or Firm* — Lee Law, PLLC; Christopher B. Lee

(57) ABSTRACT

Web marketing channel correlation information for multiple web access sessions is captured using a web sales-capable server. The web marketing channel correlation information includes, for each web access session, a session-originating web marketing channel identifier of a marketing channel that originated the web access session, and at least one cross-session correlation identifier usable to correlate sets of web access sessions and usable to correlate the sets of web access sessions with orders. In association with an order placed by a consumer using the web sales-capable server, an accumulated statistical sales contribution of each marketing channel that originated a correlated set of web access sessions that are correlated with the order is calculated based upon the captured marketing channel correlation information. The accumulated statistical sales contribution of each marketing channel is calculated using a statistically-accumulated marketing channel attribution metric associated with each correlated marketing channel.

16 Claims, 7 Drawing Sheets

(56) References Cited

U.S. PATENT DOCUMENTS

| | | | |
|---|---|---|---|
| 2009/0210409 A1 | 8/2009 | Levin | |
| 2011/0029636 A1 | 2/2011 | Smyth et al. | |
| 2011/0231390 A1 | 9/2011 | Inagaki et al. | |
| 2011/0302025 A1* | 12/2011 | Hsiao et al. | 705/14.42 |
| 2011/0314011 A1 | 12/2011 | Buehrer et al. | |
| 2012/0078708 A1* | 3/2012 | Taylor et al. | 705/14.41 |
| 2012/0303447 A1* | 11/2012 | Hughes et al. | 705/14.46 |

OTHER PUBLICATIONS

Xiangdong Liu, et al., Optimal Uniform Pricing and Return Policies for Channel Strategies in E-Commerce Age, Proceedings of the IEEE International Conference on Service Operations and Logistics, and Informatics (SOLI), Oct. 2008, pp. 1487-1492, IEEE Computer Society, Washington, DC, USA.
Avinash Kaushik, Web Analytics 2.0, Book, 2010, p. 361, Wiley Publishing, Inc., Indianapolis, IN, USA.
John Lovett, A Framework for Multicampaign Attribution Measurement, Book, Feb. 19, 2009, p. 9, Forester Research, Inc., Cambridge, MA, USA.
United States Patent and Trademark Office, Office Action for U.S. Appl. No. 14/060,154, dated Aug. 4, 2014, pp. 1-23, Alexandria, VA, USA.
United States Patent and Trademark Office, Office Action for U.S. Appl. No. 14/060,154, dated Jan. 22, 2015, pp. 1-26, Alexandria, VA, USA.
United States Patent and Trademark Office, Office Action for U.S. Appl. No. 14/060,154, dated Jul. 7, 2015, pp. 1-23, Alexandria, VA, USA.
United States Patent and Trademark Office, Examiner's Answer for U.S. Appl. No. 14/060,154, Jun. 27, 2016, pp. 1-30, Alexandria, VA, USA.

* cited by examiner

STATISTICAL MARKETING ATTRIBUTION CORRELATION

BACKGROUND

The present invention relates to web analytics for marketing attribution. More particularly, the present invention relates to statistical marketing attribution correlation.

Internet websites may used for marketing products and services to consumers. Consumers may research such products and services using these Internet websites, and may make purchases (e.g., place orders) for the respective products and services.

BRIEF SUMMARY

A method includes capturing, via a web sales-capable server for a plurality of web access sessions, web marketing channel correlation information that comprises for each web access session: a session-originating web marketing channel identifier of a marketing channel that originated the web access session, and at least one cross-session correlation identifier usable to correlate sets of web access sessions and usable to correlate the sets of web access sessions with orders; and calculating, based upon the captured marketing channel correlation information in association with an order placed by a consumer via the web sales-capable server, an accumulated statistical sales contribution of each marketing channel that originated one of a correlated set of web access sessions that are correlated with the order using a statistically-accumulated marketing channel attribution metric associated with each correlated marketing channel.

A system includes a communication interface; and a processor programmed to: capture, via the communication interface for a plurality of web access sessions, web marketing channel correlation information that comprises for each web access session: a session-originating web marketing channel identifier of a marketing channel that originated the web access session, and at least one cross-session correlation identifier usable to correlate sets of web access sessions and usable to correlate the sets of web access sessions with orders; and calculate, based upon the captured marketing channel correlation information in association with an order placed by a consumer via the web sales-capable server, an accumulated statistical sales contribution of each marketing channel that originated one of a correlated set of web access sessions that are correlated with the order using a statistically-accumulated marketing channel attribution metric associated with each correlated marketing channel.

A computer program product includes a computer readable storage medium having computer readable program code embodied therewith, where the computer readable program code when executed on a computer causes the computer to capture, for a plurality of web access sessions, web marketing channel correlation information that comprises for each web access session: a session-originating web marketing channel identifier of a marketing channel that originated the web access session, and at least one cross-session correlation identifier usable to correlate sets of web access sessions and usable to correlate the sets of web access sessions with orders; and calculate, based upon the captured marketing channel correlation information in association with an order placed by a consumer via the web sales-capable server, an accumulated statistical sales contribution of each marketing channel that originated one of a correlated set of web access sessions that are correlated with the order using a statistically-accumulated marketing channel attribution metric associated with each correlated marketing channel.

DETAILED DESCRIPTION

Figure 1:
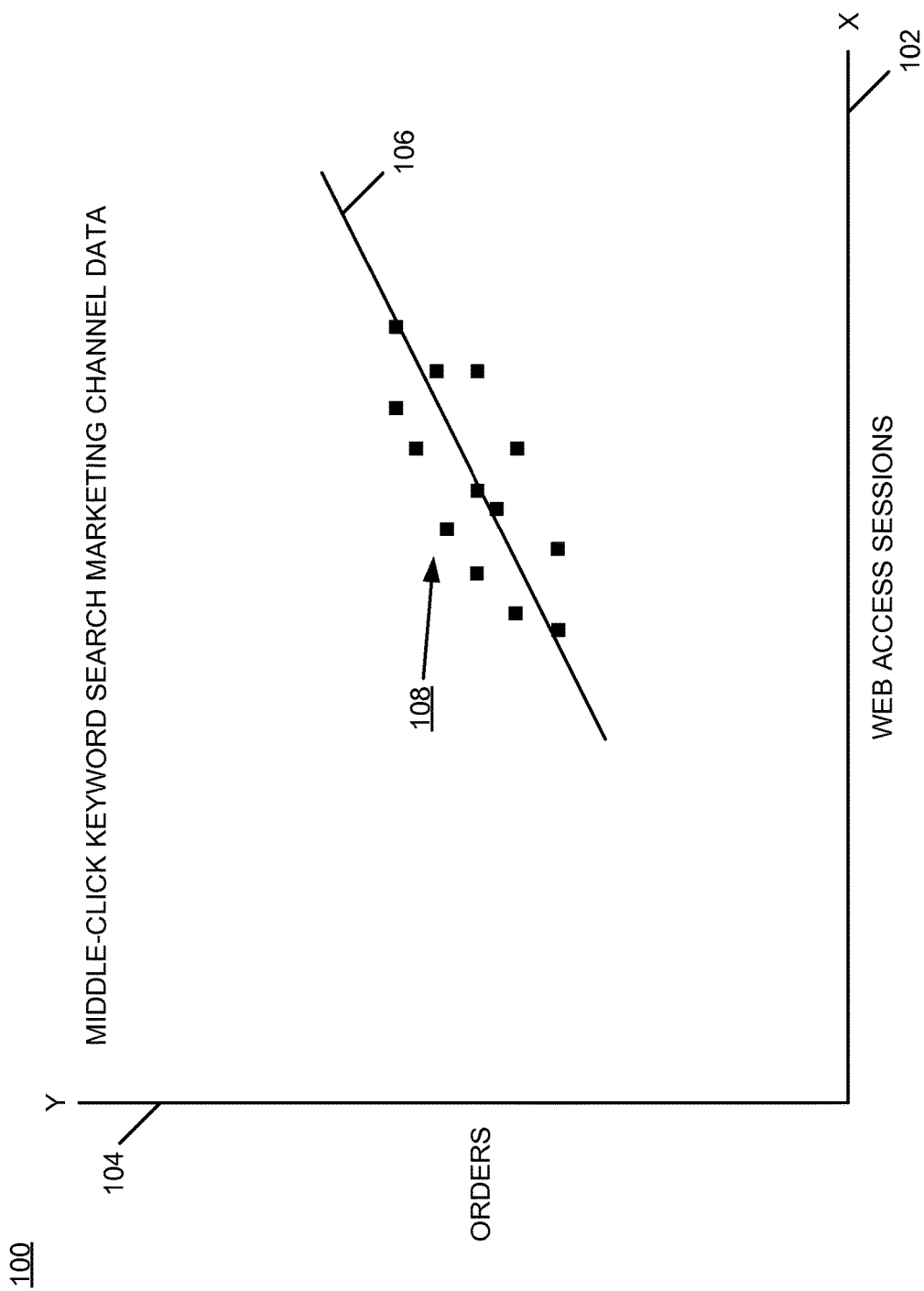
FIG. 1 is a diagram of an example of an implementation of a graph that illustrates example linear regression for a set of data points for a keyword search marketing channel for middle-click data according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides statistical marketing attribution correlation. Web marketing channel correlation information is captured for multiple web access sessions. The web marketing channel correlation information includes a session-originating web marketing channel identifier of a marketing channel that originated the web access session. The web marketing channel correlation information also includes at least one cross-session correlation identifier that is usable to correlate sets of web access sessions and that is usable to correlate the sets of web access sessions with orders placed via a web sales-capable server. In response to an order placed by a consumer via the web sales-capable server, and based upon the captured marketing channel correlation information, an accumulated statistical sales contribution of each marketing channel that originated one of a correlated set of web access sessions that are correlated with the order is calculated. The accumulated statistical sales contribution of each marketing channel is calculated using a statistically-accumulated marketing channel attribution metric associated with each correlated marketing channel.

The accumulated statistical sales contribution of each marketing channel used by a web sales-capable server may be organized into a statistical marketing attribution correlation model (herein alternatively the "model"). The statistical marketing attribution correlation model may be created to incorporate a statistically-accumulated marketing channel attribution metric of each marketing channel/touch point (alternatively "consumer interfaces") that are configured to allow consumers to access the web sales-capable server for product or service information and purchases. The statistical marketing attribution correlation model, and more particularly, the individual statistically-accumulated marketing channel attribution metrics associated with each marketing channel correlated with any given order placed via the web sales-capable server, may be updated over time in response to each order (e.g., in real-time) or in association with collective analytical processing (e.g., post-processing) of large volumes of data to statistically accumulate the marketing influence of the different web-based marketing channels/touch points that lead to the eventual orders/sales.

The statistical marketing attribution correlation model may be targeted/configured for a product, service, or may be otherwise scoped as appropriate for a given implementation. The term "cross-session correlation identifier" may include a persistent cookie identifier (ID) captured during either real-time web access session processing or for collective analytical processing and evaluation of web access session data. Alternatively, where collective analytical processing is utilized, an additional cross-session correlation identifier may be captured for session timeline recreation and may include, for example, a session identifier (that may itself include a timestamp) or an individual timestamp associated with the respective sessions that contributed to a processed order. Given the variety of implementation possibilities, capture and collection of cross-session correlation identifiers may be implemented as appropriate for the given implementation without departure from the scope of the present technology.

The real-time web access session processing may be performed, for example, via a web sales-capable server where technological processing speed relative to order volume permits real-time correlation of web access sessions with orders, as described herein. Alternatively, where large volumes of transactions may impose real-time correlation constraints, collective analytical processing may be utilized to perform the processing describe herein on one or more additional systems separate from a web-capable sales server or during lower transaction volume times for the web-capable sales server.

The term "collective analytical processing" may include any of scheduled, periodic, or other interval/frequency of post-processing of order data for one or multiple processed orders to accumulate the respective metrics, evaluate influence of marketing channels that contribute to order, and allocate perquisites (e.g., marketing credits, bonuses, or other incentives) to the respective marketing channels. As such, collective analytical processing may include the capture of data from multiple processed orders and/or multiple web-capable sales servers, and may include processing of all or a portion of the captured data (e.g., by parsing data records and correlations of stored data records) to perform correlations as described herein at any time as appropriate for a given implementation.

The terms "touch point" and "marketing channel," and plural variations of these terms, are used interchangeably herein. The terms "touch point" and "marketing channel" represent a variety of "consumer interfaces" useable by advertisers to market products and/or services, and useable by consumers to research and purchase the respective products and/or services. As such, the term "consumer interface" and its plural variant may be used herein to collectively refer to a variety of touch points and/or marketing channels. For example, a touch point or marketing channel may include consumer interfaces such as a manufacturer's or seller's website, an email-based promotional campaign, a website of an "affiliate" of a manufacturer/seller such as a coupon distribution website, a pay-per-click advertising service, and other marketing/sales interfaces. As such, the terms "touch point session" and "session" are used interchangeably herein and are used to refer to an interaction by a consumer using a consumer interface to learn about and/or purchase a particular product or service. Further, the phrase "explained by" as used herein is understood to represent a statistical term meaning that a "correlated exists" between the respective elements. Additionally, the terms "order," "purchase," and "sale" may be considered interchangeable terms herein. As such, where a person places an order via a website, that person has also purchased the product or service via the website by placing the order, which results in a sale of the particular product or service. Accordingly, a variety of touch points and marketing channels and web access session originators may be utilized to implement the present technology, and all such touch points or marketing channels and session types are considered to be within the scope of the present technology.

Regarding correlation of web-based access sessions, whether performed in real time or as part of collective analytical processing, consumer web-based access sessions with a seller's website that originate from these different consumer interfaces may be correlated to determine a statistically-significant marketing influence of each marketing channel over time. The aggregated and correlated influence is applied to each new order to partition marketing perquisites among the various marketing channels that contributed to the orders.

As new orders are placed, the actual marketing channels that were used by the consumer for the respective order are identified using the web access sessions that are captured. These web access sessions may be correlated with the order either in real time or during collective analytical processing.

These correlated marketing channels are statistically applied to the statistical marketing attribution correlation model (e.g., the respective metrics) to update the model with the respective marketing channel influences/contributions that lead to that particular sale. The updated statistical marketing attribution correlation model is then used to statistically attribute marketing influence to the correlated marketing channels that contributed to that particular sale. The attributed marketing influence is used to distribute perquisites to the respective marketing channels that contributed to that particular sale. As such, statistical leveraging of previous marketing influence may be improved by web access session data, gathered from and correlated with each order that is placed, to refine the statistical application of marketing influence over time. The most-recent statistical marketing attribution correlation model is used to assign/ attribute marketing influence and perquisites to individual marketing contributors that assisted with the order.

Accordingly, the statistical marketing attribution correlation model evolves over time as new orders are placed by consumers using the various available consumer interfaces. Web-based access sessions by consumers that lead to eventual orders/sales are correlated based upon particular products or services, such as by manufacturer or service provider. Either as orders for products or services are placed, or during collective analytical processing, the correlated web-based sessions that resulted in that sale are identified. Marketing influences of the different web-based marketing channels/touch points that lead to the eventual orders/sales may be statistically correlated within a statistical marketing attribution correlation model.

As web access sessions are originated by consumers, web-based access session data including web marketing channel correlation information, as described above and in more detail below, may be captured. For example, as consumers research product/service decisions/selections and place product or service orders, web marketing channel correlation information may be captured. The captured web marketing channel correlation information may be stored, for example, in a database. Alternatively, a session correlation data structure, file, or other storage format usable to correlate the web access sessions that originate from a browser used by the consumer may be created to capture and correlate sessions associated with a particular product or service. Any data storage format appropriate for a given implementation may be utilized.

The marketing channels used by the consumer for each web access session may be identified and integrated into the web marketing channel correlation information usable to correlate, either during collective analytical processing or in real time, the web access sessions that originate from a browser used by the consumer. To accumulate the statistical sales contribution of each marketing channel associated with an order, data accumulated within the web marketing channel correlation information may be used to update the statistical marketing attribution correlation model and to incorporate the new accumulated data associated with that particular order into the model. In this manner, the contribution of each marketing channel may be continually integrated to statistically accumulate the respective marketing channel attribution metrics of the marketing channels correlated with that particular order. The updated model (and the updated statistically-accumulated marketing channel attribution metrics) may then be used to attribute marketing influence to the actual consumer interfaces used by consumers.

Sales perquisites may then be allocated in a statistically correlated manner to the respective marketing channels based upon their respective statistically-accumulated marketing channel attribution/contribution to the order(s). For example, the determined statistical correlation of the marketing influences of the various consumer interfaces over time may be applied to one or more new orders based upon the actual marketing channels that were used during the respective consumer's research and purchasing decision-making process to attribute proportions of the revenue(s) for each sale to the respective consumer interfaces that were used.

To further elaborate on the statistical marketing attribution correlation model, the model operates by evaluating the statistical relationship for sales contribution/influence between touch point sessions originated by a consumer using the different consumer interfaces and the eventual consumer sale that may be statistically explained by those sessions. The statistical marketing attribution correlation model allows marketers/advertisers to understand how much of the revenue from each sale should be attributed to each marketing channel involved in or that influenced the sale. As such, the statistical marketing attribution correlation model may be used to determine how much (e.g., a percentage of, proportion of, etc.) sales credit and perquisites to attribute and prorate to each consumer interface/channel based upon how closely a given sale relates to the respective sessions that influenced the sale. Accordingly, improved sales credit/attribution and perquisite distribution among multiple consumer interfaces may be obtained by use of the present technology.

Many variations are possible with respect to the implementation of the statistical marketing attribution correlation model and/or the respective statistically-accumulated marketing channel attribution metrics, whether implemented within such a model or independently, and the examples herein should not be considered limiting. The examples herein utilize a correlation coefficient with a numeric value that represents a measure of a correlation between an increase in web access sessions initiated using any particular consumer interface and any linear dependence with the number of resulting orders/sales that originate from that particular consumer interface. It should be noted that the correlation coefficient may vary based upon whether there is or is not a linear dependence with the number of resulting orders/sales. This correlation coefficient may be determined for each consumer interface and the set of correlation coefficients may be used to form the basis upon which the statistical marketing attribution correlation model operates to prorate/partition attribution for different consumer interfaces that influenced the resulting sale.

One example correlation coefficient that may be used within a statistical marketing attribution correlation model for evaluations of each marketing channel includes a statistical term referred to as "R squared" (e.g., $R^2$, or R-Squared herein). Use of the R-Squared statistical correlation coefficient yields a percentage of the number of orders/sales that may be explained by any given marketing channel's sessions. From this result, the statistical marketing attribution correlation model infers that marketing channels with a higher R-Squared value have been more influential in sales and allocates more credit for sales than ones with a lower correlation (e.g., lower R-Squared value).

For purposes of the following example, it is assumed that data may be collected for web access sessions associated with each marketing channel of interest relative to orders that are placed using the respective marketing channel. Additionally, the present technology may be used to differentiate, whether in real time or during collective analytical processing, between "first-click" web access sessions (e.g., where a consumer purchases on the very first visit), "last-click" web access sessions (e.g., where a consumer has visited the sales server website previously without purchasing and purchased via a last web access session), and "middle-click" web access sessions (e.g., any one or more intermediate web access sessions between the first-click and last-click web access sessions).

This data for each marketing channel and for each of the first-click, middle-click, and last-click web access sessions may be plotted via separate graphs. These graphs, again for each of the first-click, middle-click, and last-click web access sessions, may be plotted as a collection of data points with a number of web access sessions on a horizontal (e.g., "x") axis and a number of orders on a vertical (e.g., "y")

axis. A line of correlation may be approximated through the respective points using linear regression on each graph, and a correlation coefficient may be calculated for each marketing channel in the respective purchasing sequence relative to the line.

FIG. 1 is a diagram of an example of an implementation of a graph 100 that illustrates example linear regression for a set of data points for a keyword search marketing channel for middle-click data. It is understood that the representations within FIG. 1 are for purposes of illustration of concepts only. As such, actual numbers are omitted from FIG. 1. However, it can be seen from the graph 100 that a horizontal X-Axis 102 represents numbers of web access sessions, while a vertical Y-Axis 104 represents numbers of orders that are correlated with the web access sessions. A line of linear regression 106 depicts a linear relationship (e.g., trend) among a depicted set of data points 108. It is this linear relationship between a set of data points from actual correlated web access sessions and orders that are placed in association with the correlated web access sessions to which statistical processing for correlation values may be applied, as described in more detail below. For purposes of the present example, it is sufficient to note that some elements of the set of data points 108 are closer to the line of linear regression 106 and some of the elements are further from the line of linear regression 106.

The following Equation (1) represents one possible implementation of a formula for a statistical variable "r" that may be squared to arrive at R-Squared values for data points relative to a linear regression, as with the example of FIG. 1 described above.

$$r = \frac{\sum (x - \bar{x})(y - \bar{y})}{\sqrt{\sum (x - \bar{x})^2 \sum (y - \bar{y})^2}}. \quad \text{Equation (1)}$$

The variables within Equation (1) represent values relative to an X-Axis and a Y-Axis for a set of data points, and may be applied as described herein to data points for first-click, middle-click, and last-click data for various marketing channels utilized by a web-based sales entity. Specifically, the variable "r" represents a correlation coefficient. Squaring "r" yields R-Squared as used herein for example and yields the percentage of dependence between the respective "X" and "Y" components of data points of a given set of data points.

As represented by Equation (1), data values may be accumulated for web access sessions for each consumer interface that is correlated with a particular order. Across all configured consumer interfaces, a linear relationship of coordinates of different data points may be derived and may be used to evaluate the value of the variable "r." The value of the variable "r" may be lower for relatively non-linear correlations, and may be closer to/approach the value of "1" for highly linear correlations (e.g., closer to the line of linear regression of the set of data points). The correlation coefficient R-Squared may be derived for each consumer interface by squaring the variable "r" derived for each consumer interfaces as described above to arrive at an R-Squared value for each consumer interface that is correlated with a particular order. The R-Squared value may be used to evaluate the marketing influence contributed by different marketing channels. As also described above, the R-Squared statistical correlation coefficient represents one possible approach for statistical correlation of web access sessions (and the related marketing channels) to orders, and any other form of statistical correlation may be used. For example, "multiple regression" techniques using a set of variables with an output result, or other statistical techniques may be used, without departure from the scope of the present technology. As such, any form of statistical correlation may be used as appropriate for a given implementation.

To establish a foundation upon which the following example web access correlation sequence may be described, it should be noted that a persistent cookie (e.g., a cookie identifier (ID) cookie, or master session correlation cookie) may be used to correlate cross-session activities, and is considered as one possible cross-session correlation identifier. The persistent cookie may be stored in the browser of the consumer's computing device in response to a "first-click" web access session to a web sales-capable server that hosts the product information. This persistent cookie may include a cookie identifier (ID) that may be used to correlate all web access sessions and session cookies. It is additionally noted that each subsequent web access session that is related to the first-click session (e.g., one or more "middle-click" web access session(s) and a "last-click" web access session during which an order is placed) results in creation of a temporary session cookie that includes a session ID (another possible cross-session correlation identifier) in the browser of the consumer's computing device that exists for the duration of the respective web access session. Every web page and everything the consumer clicks may be configured to provide data back to the consumer's browser.

As such, the first-click web access session creates and stores a session cookie and cookie ID cookie (persistent cookie) within the browser of the consumer's computing device. Each web page may be configured with tags, and the tags may generate information and send that generated information to a session correlation database with the cookie ID and the session number/identifier attached to the information. The information provided for the session on the consumer's computing device may include one or more marketing tracking parameters. These marketing tracking parameters may include an identifier of the marketing channel (e.g., a marketing management center (MMC) identifier, product identifiers, or other information as appropriate for a given implementation).

It is understood that the session cookie may be deleted from the consumer's browser either in response to an exit from the web access session (e.g., closing the browser, etc.), may be deleted in response to an inactive session timeout, or otherwise may be deleted as appropriate for a given implementation. The next time the consumer initiates a web access session, because the persistent cookie in still present within the browser, there is a cookie ID number from prior web access sessions and a new session cookie is created for the new web access session. As such, the present technology correlates web access sessions across multiple web accesses to a web sales-capable server with a master cookie ID. The web access session cookie(s) may all be correlated together with the persistent cookie identifier and the web access session data, including the marketing channel associated with each web access session, may be correlated to distribute perquisites from the sale that is ultimately associated with the last-click web access session, as described in more detail below.

To provide flexibility of implementation of the web access session correlation described herein, the session cookie keys of the various sessions may be aligned with the session data for the respective sessions in a session correlation database, as described in more detail below. Further, the different session keys may be keyed to the consumer's browser (or technically the computing device used by the consumer) with the cookie ID or persistent cookie within the session correlation database. Accordingly, the statistical marketing attribution correlation described herein may be performed at any time as long as the session data is available within the session correlation database.

To perform the processing described herein using collective analytical processing of one or more sets of order data, a time stamp associated with each session that is correlated with a persistent cookie may also be captured as part of the session information to allow post-processing to identify first-click web access sessions, middle-click web access sessions, and last-click web access sessions within the session correlation database. Alternatively, time stamp capture may be omitted for real-time correlation activities where the respective first-click web access sessions, any middle-click web access session(s), and last-click web access sessions are identified as web access sessions occur.

Based upon the description of the foundational technology described above, the following example web access correlation sequence provides context for the drawing descriptions that follow. The following example utilizes a product-based purchase/order sequence for ease of illustration purposes, though it is understood that a service-based purchase or order sequence may also be processed similarly. For purposes of example, three web access sessions for different forms of consumer interactions associated with product research and purchase are utilized.

The first web access session of this example web access correlation sequence is a keyword search, where the consumer performs an initial search for product information using a generic identifier (e.g., "golf clubs," "tennis rackets," etc.) to identify available brands and models. It is further assumed that as a result of this keyword search the consumer is presented with a pay-per-click link to product information related to products by a particular manufacturer that satisfy the keyword search, and that the consumer follows the pay-per-click link and reads about available products from this manufacturer. As the pay-per-click link is selected, a web sales-capable server that hosts the product information begins web access session correlation activities by creating a persistent cookie (e.g., a cookie ID cookie) within the consumer's web browser and a session identifier for the session. For purposes of this example, the keyword search session is a "first-click" web access session, and may be identified as such either in real-time or during collective analytical processing.

The pay-per-click link that is selected by the consumer may include a marketing channel identifier (e.g., appended to the link, or otherwise associated) that is usable to identify the pay-per-click marketing channel source, which for purposes of this example, is the keyword search marketing channel. The web sales-capable server correlates the keyword search marketing channel from which the pay-per-click link was selected with the first-click web access session either by creation of a record for the web access session within the session correlation database or by creation of an entry within a session correlation data structure or other storage format. For purposes of the present example, it is further assumed that the consumer identifies a preferred model of product as a result of this initial research, but does not purchase during the initial research stage.

The second web access session of the example web access correlation sequence is a user-initiated access to a coupon website where the consumer finds a manufacturer's coupon for the preferred manufacturer/model and obtains a coupon code that may be used at the manufacturer's website where the product may be ordered. It is further assumed that the coupon website hosts a link to the manufacturer's web sales-capable server that was previously accessed during the first-click session, and that the consumer traverses the link to the web sales-capable server.

For purposes of this example web access correlation sequence, the coupon web access session is considered a "middle-click" web access session. It is further understood that any number of middle-click web access sessions may be identified and correlated as appropriate for a given user interaction. As such, where four or more web access sessions are correlated, each session other than the first-click web access session and a last-click web access session (as described below) may be considered middle-click web access sessions and each middle-click web access session may be processed and correlated as described for the middle-click session within the present example web access correlation sequence.

Continuing with the present example, it is assumed that when the consumer selects the link and accesses the manufacturer's web sales-capable server, the user finds that shipping charges will be reduced or excluded if the consumer waits for a holiday to purchase the product. As such, the consumer has a coupon code, but has not used the coupon code yet to purchase the product.

The coupon website link that is selected by the consumer may include a marketing channel identifier (e.g., appended to the link, or otherwise associated) that is usable to identify the coupon website marketing channel source, which for purposes of this example, is the coupon website marketing channel. The web sales-capable server correlates the keyword search marketing channel from which the coupon link was selected with the middle-click web access session, again either in real-time or during collective analytical processing.

To correlate the web access session (e.g., first-click and middle-click sessions), in response to the middle-click web access session being initiated from the coupon website, the web sales-capable server determines that the consumer has accessed the web sales-capable server previously by identification of the persistent cookie created by the web sales-capable server and associated with the browser used by the consumer. The web sales-capable server creates a new web access session with a web access session identifier, and captures web marketing channel correlation information for the session that may be used to correlate this new web access session with the previous first-click web access session. The web sales-capable server also captures the marketing channel information (e.g., a coupon website marketing channel identifier) usable to correlate that marketing channel identifier with the correlated web access sessions.

Regarding the third web access session of this example web access correlation sequence, it is assumed that the holiday season has arrived and the consumer is interested in taking advantage of the reduced/excluded shipping if the coupon code is still accepted by the manufacturer's web sales-capable server. As such, it is further assumed that the consumer performs a trademark search to expedite location of and direct navigation to the manufacturer's website, where the consumer enters the manufacturer and/or model information to find the manufacturer's website. It is further assumed that the consumer finds a URL to the manufacturer's website and selects the link to complete the order/purchase of the preferred product using the coupon code. For purposes of this example web access correlation sequence, the purchase (e.g., order placed) using the obtained coupon code results is this web access session being considered a "last-click" web access session.

To correlate the last-click web access session with the first-click and middle-click sessions, in response to the last-click web access session being initiated from the manufacturer's website, the web sales-capable server again determines that the consumer has accessed the web sales-capable server previously by identification of the persistent cookie created by the web sales-capable server and associated with the browser used by the consumer. The web sales-capable server creates a new web access session with a web access session identifier, and captures web marketing channel correlation information for the session that may be used to correlate this new web access session with the previous first-click web and middle-click access sessions. The web sales-capable server also captures the marketing channel information (e.g., a trademark search marketing channel identifier) usable to correlate that marketing channel identifier with the correlated web access sessions.

In response to the order being placed, the web sales-capable server may continue processing to update the statistically-accumulated marketing channel attribution metric (e.g., within a model) associated with each correlated marketing channel that influenced the order. Alternatively, this portion of the processing may be deferred, as described above, and performed during separate collective analytical processing.

Within this example, the correlated marketing channels include the keyword search marketing channel, the coupon website marketing channel, and the trademark search marketing channel. It is understood that any number of marketing channels may be correlated and that the present example web access correlation sequence is for purposes of example only and not limitation.

The following Table (1) represents example updated statistically-accumulated marketing channel attribution metrics with hypothetical values that represent potential results that may be generated by application of the R-Squared correlation coefficient to a set of example marketing channels associated with an order using the example marketing channels described above.

TABLE (1)

Example R-Squared Data Values

| Marketing Channel | R-Squared for First Click | R-Squared for Middle Click | R-Squared for Last Click |
|---|---|---|---|
| Paid Search (Keyword) | 0.28 | 0.21 | 0.54 |
| Shopping Partners (Coupon) | 0.42 | 0.46 | 0.36 |
| Paid Search (Trademark) | 0.22 | 0.15 | 0.34 |

As can be seen from the example data within Table (1) above, the statistically-accumulated marketing channel attribution metrics updated in response to the order show that the statistically-accumulated influence/metric of the keyword search marketing channel as a first-click marketing channel is twenty-eight hundredths (0.28). Similarly, the statistically-accumulated influence/metric of the coupon website marketing channel as a middle-click marketing channel is forty-six hundredths (0.46). Additionally, the statistically-accumulated influence/metric of the trademark search marketing channel as a last-click marketing channel is thirty-four hundredths (0.34). The sum of the statistically-accumulated influences, achieved by adding the individual statistically-accumulated influences together, equals one and eight hundredths (1.08), which is used, as described below, as the basis from which to assign percentages of marketing attribution to the respective marketing channels.

These metrics may be used to attribute sales credit for the order to the respective marketing channels based upon their influence of this particular sale, as integrated into the historical influence represented by the respective statistically-accumulated marketing channel attribution metrics. Additionally, any available perquisites that are to be distributed to the respective marketing channels may be partitioned using the updated statistically-accumulated marketing channel attribution metrics.

For example, dividing each statistically-accumulated influence by the sum of the statistically-accumulated influences arrives at a percentage of contribution that may be assigned to each marketing channel. Based upon the respective position of the keyword search marketing channel (e.g., 0.28) as a first-click marketing channel, the keyword search marketing channel may be allocated twenty-six percent (26%) of the available proceeds for distribution to marketing channels. This percentage is calculated as the individual statistically-accumulated influence of the keyword marketing channel (0.28) divided by the sum of the statistically-accumulated influences (1.08), rounded to the nearest percentage for convenience, though additional decimal places may be utilized as appropriate for a given implementation. Similarly, based upon the respective position of the coupon website marketing channel as a middle-click marketing channel and its individual statistically-accumulated influence, and using the same form of calculation, the coupon website marketing channel may be allocated forty-three percent (43%) of the available proceeds for distribution to marketing channels. Additionally, based upon the respective position of the trademark search marketing channel as a last-click marketing channel and its individual statistically-accumulated influence, and using the same form of calculation, the trademark search marketing channel may be allocated thirty-one percent (31%) of the available proceeds for distribution to marketing channels. Collectively, these percentages add to one hundred percent (100%) and may be used to effectively allocate the respective influences, and perquisites, to the respective marketing channels.

It should be noted that, though only three marketing channels associated with the example web access correlation sequence described above are illustrated, statistically-accumulated marketing channel attribution metrics may be captured and updated for all marketing channels used by a particular web sales entity. As such, a statistical marketing attribution correlation model may include any number of statistically-accumulated marketing channel attribution metrics.

Based upon the example correlated sets of web access sessions, the updated statistically-accumulated marketing channel attribution metrics (e.g., R-Squared values within this example) are updated according to each marketing channel's influence on the current order. Further, perquisites may be partitioned among a variety of disparate marketing channels more effectively based upon their influence over time.

It should be noted that conception of the present subject matter resulted from recognition of certain limitations associated with sales success/attribution among different consumer interfaces. For example, it was observed that multiple consumer interfaces are available to consumers and that consumers may use several of these consumer interfaces during their research activities prior to and in conjunction with a purchase. It was additionally observed that conventional approaches to attribution (e.g., distribution) of sales successes/revenues/credit among the different consumer interfaces are limited due to an uncertainty of how much influence toward the ultimate sale each consumer interface provided. It was determined in view of these observations that a mathematical objective approach to determining the respective influence of different consumer interfaces and weighting of the sales credits for sales among the different consumer interfaces based upon their respective determined influences is desirable. The present subject matter improves sales success/attribution among different consumer interfaces by providing technology for creating and applying an objective mathematical sales attribution model to distribute sales credits among the different consumer interfaces, as described above and in more detail below. Using the present technology, the contributions/influence of each consumer interface may be determined and weighted, and sales revenues may be attributed to/distributed among the different consumer interfaces. As such, improved sales success/attribution among different consumer interfaces may be obtained by use of the present technology.

As described above, the statistical marketing attribution correlation described herein may be performed in real time to allow prompt determination of attribution partitioning between multiple marketing channels/touch points associated with a sale to a consumer. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 2:
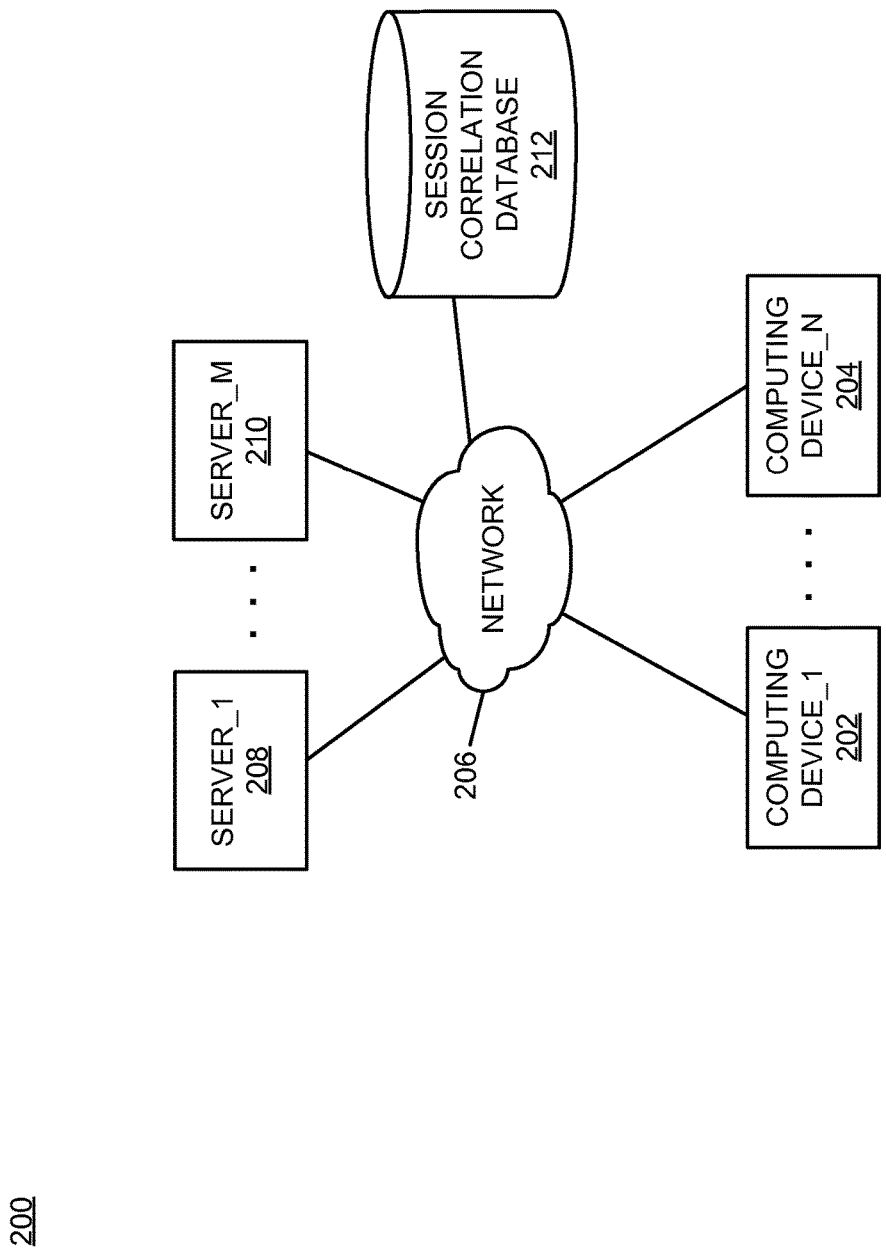
FIG. 2 is a block diagram of an example of an implementation of a system for statistical marketing attribution correlation according to an embodiment of the present subject matter.

FIG. 2 is a block diagram of an example of an implementation of a system 200 for statistical marketing attribution correlation. A computing device_1 202 through a computing device_N 204 communicate via a network 206 with several other devices. The other devices include a server_1 208 through a server_M 210. A session correlation database 212 provides storage and processing space for correlation of web access sessions performed by one or more of the server_1 208 through the server_M 210, as described in more detail below.

The computing device_1 202 through the computing device_N 204 may be any device capable of use by a consumer to search, review, and purchase products and or services via one or more of the server_1 208 through the server_M 210. It should further be noted that any of the respective computing devices 202 through 204 may be portable computing devices, either by a user's/consumer's ability to move the respective computing devices to different locations, or by the respective computing device's association with a portable platform, such as a plane, train, automobile, or other moving vehicle. For example, the respective computing devices 202 through 204 may include devices such as a personal computer (e.g., desktop, laptop, etc.) or a handheld device (e.g., cellular telephone, personal digital assistant (PDA), email device, music recording or playback device, tablet computing device, e-book reading device, etc.) or any other device capable of processing information as described above and in more detail below.

The server_1 208 through the server_M 210 may include any device capable of providing data for consumption by a device, such as the computing device_1 202 through the computing device_N 204, via a network, such as the network 206. The server_1 208 through the server_M 210 may each include a web server, application server, or other data server device. Further, one or more of the server_1 208 through the server_M 210 may be considered a web sales-capable server (e.g., a server capable of processing orders/purchases for consumers) for purposes of the present description.

It should be noted that while the present examples depict the computing device_1 202 through the computing device_N 204 as devices used by consumers to research and place orders, and depict the server_1 208 through the server_M 210 as devices that provide information and order processing services, this should not be considered limiting. For example, one or more of the computing device_1 202 through the computing device_N 204 may provide information and order processing services. As such, a variety of implementation possibilities exist for the present subject matter, and all such implementation possibilities are considered within the scope of the present description.

The network 206 may include any form of interconnection suitable for the intended purpose, including a private or public network such as an intranet or the Internet, respectively, direct inter-module interconnection, dial-up, wireless, or any other interconnection mechanism capable of interconnecting the respective devices.

As will be described in more detail below in association with FIG. 3 through FIG. 6B, one or more of the server_1 208 through the server_M 210 may each provide automated statistical marketing attribution correlation. The automated statistical marketing attribution correlation is based upon correlation of sets of web access sessions by consumers and based upon correlation of those sets of web access sessions with orders/purchases of goods and/or services that may be statistically explained by (e.g., influenced by) the correlated sets of web access sessions.

Figure 3:
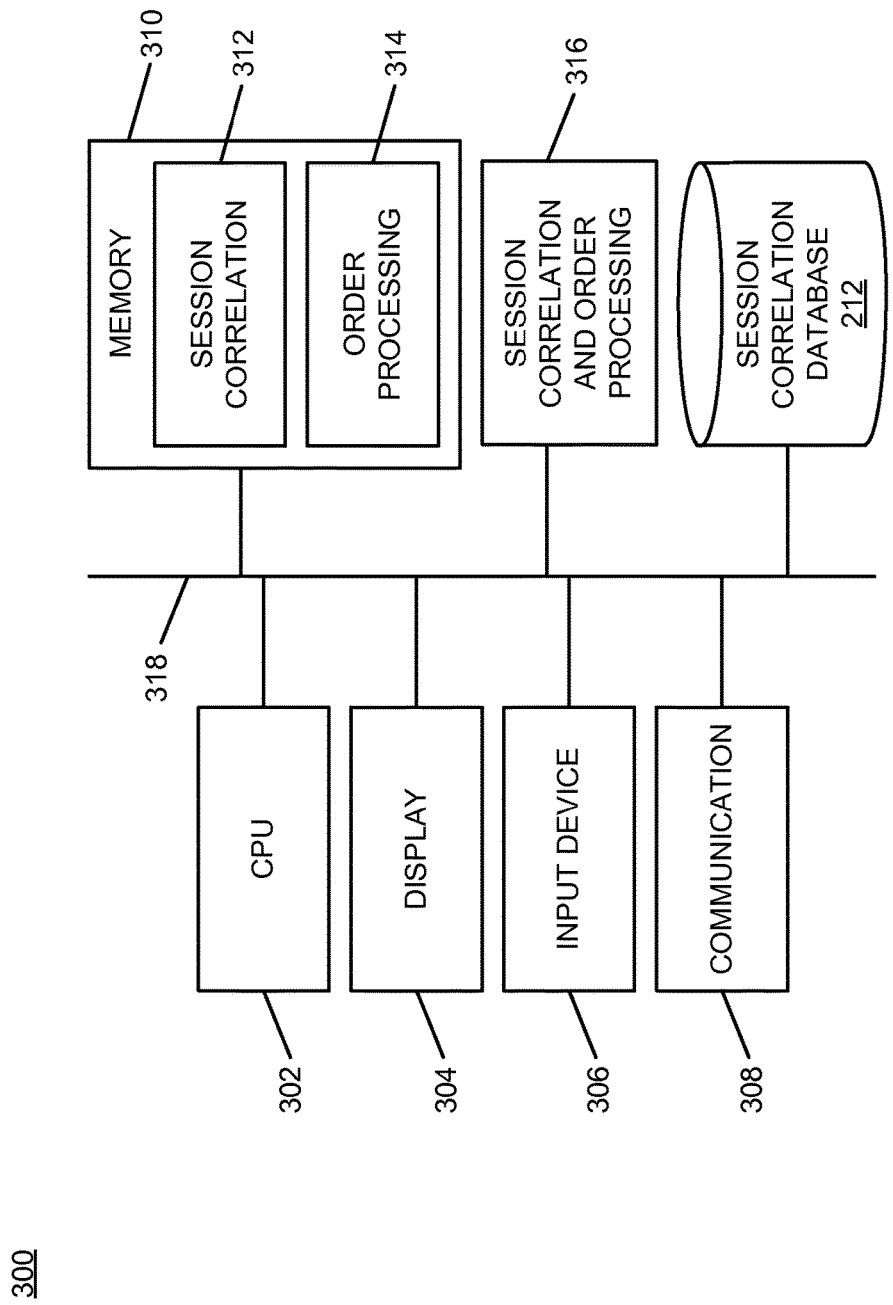
FIG. 3 is a block diagram of an example of an implementation of a core processing module capable of performing statistical marketing attribution correlation according to an embodiment of the present subject matter.

FIG. 3 is a block diagram of an example of an implementation of a core processing module 300 capable of performing statistical marketing attribution correlation. The core processing module 300 may be associated with either the computing device_1 202 through the computing device_N 204 and/or with the server_1 208 through the server_M 210, as appropriate for a given implementation. As such, the core processing module 300 is described generally herein, though it is understood that many variations on implementation of the components within the core processing module 300 are possible and all such variations are within the scope of the present subject matter.

Further, the core processing module 300 may provide different and complementary processing of web access sessions in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 302 provides computer instruction execution, computation, and other capabilities within the core processing module 300. A display 304 provides visual information to a user of the core processing module 300 and an input device 306 provides input capabilities for the user.

The display 304 may include any display device, such as a cathode ray tube (CRT), liquid crystal display (LCD), light emitting diode (LED), electronic ink displays, projection, touchscreen, or other display element or panel. The input device 306 may include a computer keyboard, a keypad, a mouse, a pen, a joystick, touchscreen, or any other type of input device by which the user may interact with and respond to information on the display 304.

It should be noted that the display 304 and the input device 306 may be optional components for the core processing module 300 for certain implementations/devices. Accordingly, the core processing module 300 may operate as a completely automated embedded device without direct user configurability or feedback. However, the core processing module 300 may also provide user feedback and configurability via the display 304 and the input device 306, respectively, as appropriate for a given implementation.

A communication module 308 provides interconnection capabilities that allow the core processing module 300 to communicate with other modules within the system 200. The communication module 308 may include any electrical, protocol, and protocol conversion capabilities useable to provide interconnection capabilities, appropriate for a given implementation.

A memory 310 includes a session correlation storage area 312 that stores web access session information for the core processing module 300. For example, the session correlation storage area 312 may store one or more session correlation data structures, files, or other storage format, and other information usable to correlate the web access sessions that originate from a browser used by the consumer. The session correlation data structures, files, or other storage formats may store session cookie identifiers (IDs), such as persistent cookie IDs and session cookie IDs, that are useable to correlate web access sessions with one another and with orders.

The memory 310 also includes an order processing storage area 314 that stores order processing information for the core processing module 300. For example, the order processing storage area 314 may store marketing channel attribution metrics for different marketing channels that may be statistically-accumulated over time to attribute sales credit to the respective marketing channels based upon their respective influence as statistically determined over time. The order processing storage area 314 may store the statistically-accumulated marketing channel attribution metrics within one or more statistical marketing attribution correlation models.

It should be noted that while the present example partitions the information described as stored in the memory 310 into the session correlation storage area 312 and the order processing storage area 314, this information may be combined or organized differently as appropriate for a given implementation. Further, additional information usable to perform the processing described herein may be implemented as appropriate for the given implementation.

It is understood that the memory 310 may include any combination of volatile and non-volatile memory suitable for the intended purpose, distributed or localized as appropriate, and may include other memory segments not illustrated within the present example for ease of illustration purposes. For example, the memory 310 may include a code storage area, an operating system storage area, a code execution area, and a data area without departure from the scope of the present subject matter.

A session correlation and order processing module 316 is also illustrated. The session correlation and order processing module 316 provides web access session correlation to identify sets of web access sessions that influence orders, and provides order processing capabilities to process those orders. The session correlation and order processing module 316 also provides statistical order analysis for accumulation and evaluation of marketing channel attribution metrics associated with each marketing channel utilized by a web sales-capable server that implements the core processing module 300, as described above and in more detail below. The session correlation and order processing module 316 implements the statistical marketing attribution correlation of the core processing module 300.

It should also be noted that the session correlation and order processing module 316 may form a portion of other circuitry described without departure from the scope of the present subject matter. Further, the session correlation and order processing module 316 may alternatively be implemented as an application stored within the memory 310. In such an implementation, the session correlation and order processing module 316 may include instructions executed by the CPU 302 for performing the functionality described herein. The CPU 302 may execute these instructions to provide the processing capabilities described above and in more detail below for the core processing module 300. The session correlation and order processing module 316 may form a portion of an interrupt service routine (ISR), a portion of an operating system, a portion of a browser application, or a portion of a separate application without departure from the scope of the present subject matter.

It should further be noted that implementations of the core processing module 300 that are consumer-device centric (e.g., used by a consumer for research and purchasing of products and/or services) may omit the session correlation storage area 312 and the session correlation and order processing module 316, if appropriate. Further, the order processing storage area 314 may be implemented to manage orders for the consumer, again as appropriate for a given implementation.

The session correlation database 212 is also shown associated with the core processing module 300 within FIG. 3 to show that the session correlation database 212 may be coupled to the core processing module 300 without requiring external connectivity, such as via the network 206.

The CPU 302, the display 304, the input device 306, the communication module 308, the memory 310, the session correlation and order processing module 316, and the session correlation database 212 are interconnected via an interconnection 318. The interconnection 318 may include a system bus, a network, or any other interconnection capable of providing the respective components with suitable interconnection for the respective purpose.

Though the different modules illustrated within FIG. 3 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 300 is illustrated with and has certain components described, other modules and components may be associated with the core processing module 300 without departure from the scope of the present subject matter. Additionally, it should be noted that, while the core processing module 300 is described as a single device for ease of illustration purposes, the components within the core processing module 300 may be co-located or distributed and interconnected via a network without departure from the scope of the present subject matter. For a distributed arrangement, the display 304 and the input device 306 may be located at a point of sale device, kiosk, or other location, while the CPU 302 and memory 310 may be located at a local or remote server. Many other possible arrangements for components of the core processing module 300 are possible and all are considered within the scope of the present subject matter. It should also be understood that, though the session correlation database 212 is illustrated as a separate component for purposes of example, the information stored within the session correlation database 212 may also/alternatively be stored within the memory 310 without departure from the scope of the present subject matter. Accordingly, the core processing module 300 may take many forms and may be associated with many platforms.

FIG. 4 through FIG. 6B described below represent example processes that may be executed by devices, such as the core processing module 300, to perform the statistical marketing attribution correlation associated with the present subject matter. Many other variations on the example processes are possible and all are considered within the scope of the present subject matter. The example processes may be performed by modules, such as the session correlation and order processing module 316 and/or executed by the CPU 302, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

Figure 4:
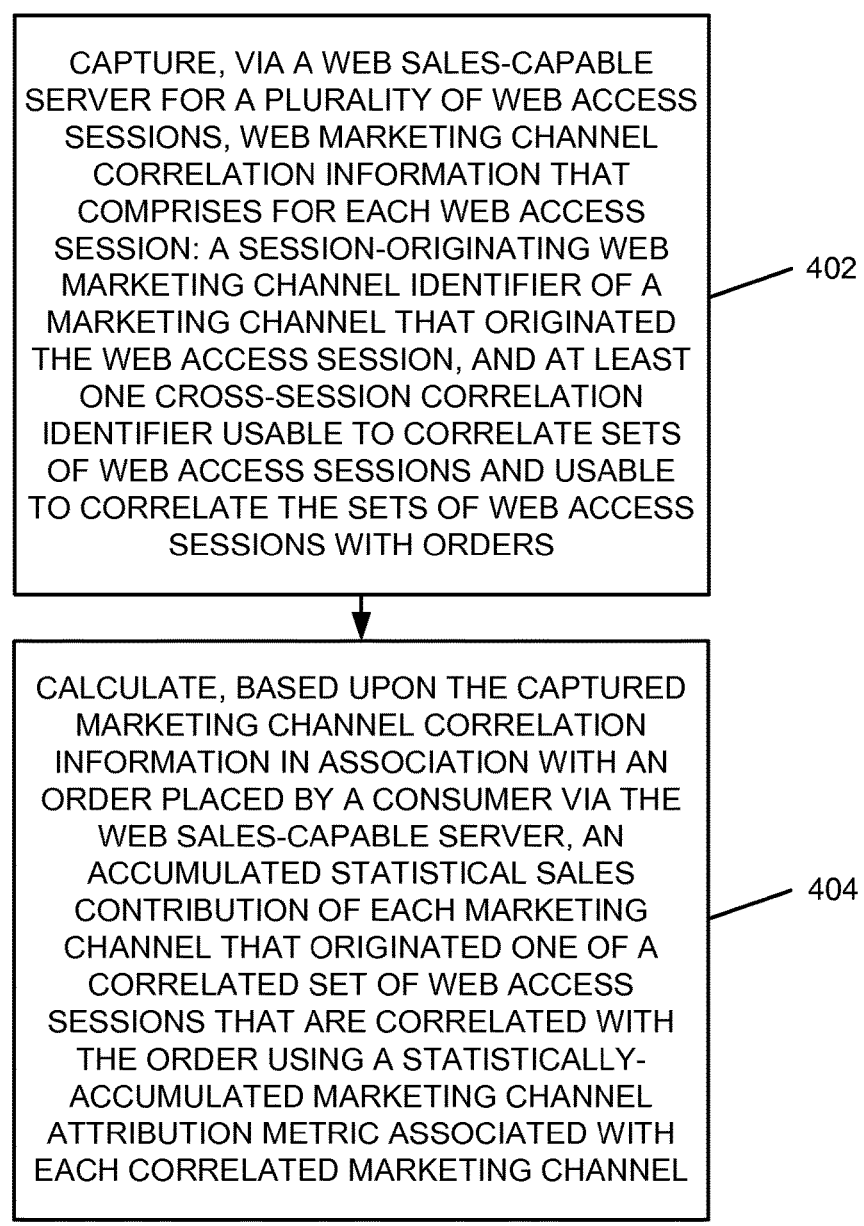
FIG. 4 is a flow chart of an example of an implementation of a process for statistical marketing attribution correlation according to an embodiment of the present subject matter.

FIG. 4 is a flow chart of an example of an implementation of a process 400 for statistical marketing attribution correlation. At block 402, the process 400 captures, via a web sales-capable server for a plurality of web access sessions, web marketing channel correlation information that comprises for each web access session: a session-originating web marketing channel identifier of a marketing channel that originated the web access session, and at least one cross-session correlation identifier usable to correlate sets of web access sessions and usable to correlate the sets of web access sessions with orders. At block 404, the process 400 calculates, based upon the captured marketing channel correlation information in association with an order placed by a consumer via the web sales-capable server, an accumulated statistical sales contribution of each marketing channel that originated one of a correlated set of web access sessions that are correlated with the order using a statistically-accumulated marketing channel attribution metric associated with each correlated marketing channel.

Figure 5A:
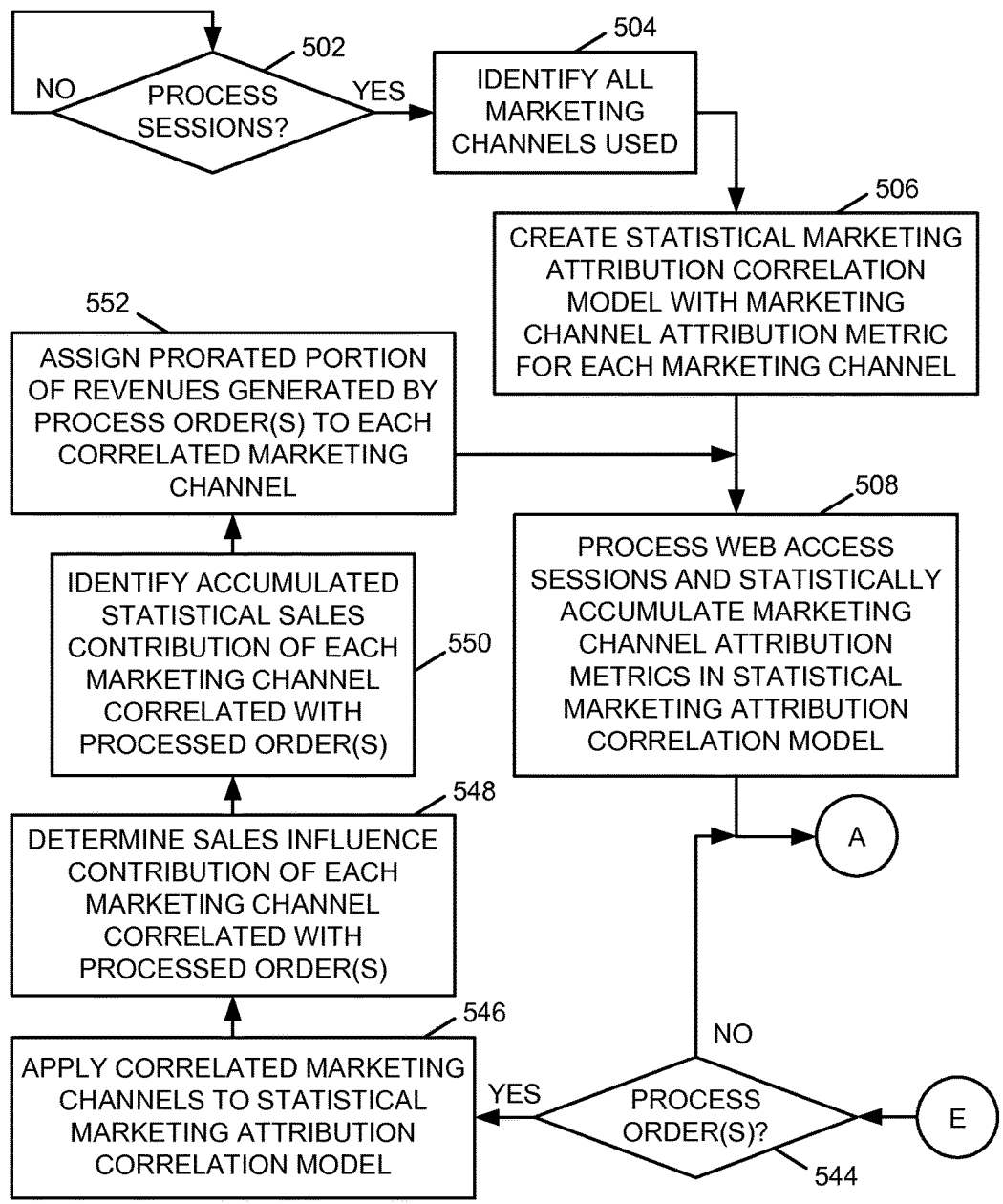
FIG. 5A is a flow chart of an example of an implementation of initial processing within a process for web access session correlation and marketing channel attribution for statistical marketing attribution correlation according to an embodiment of the present subject matter.
Figure 5B:
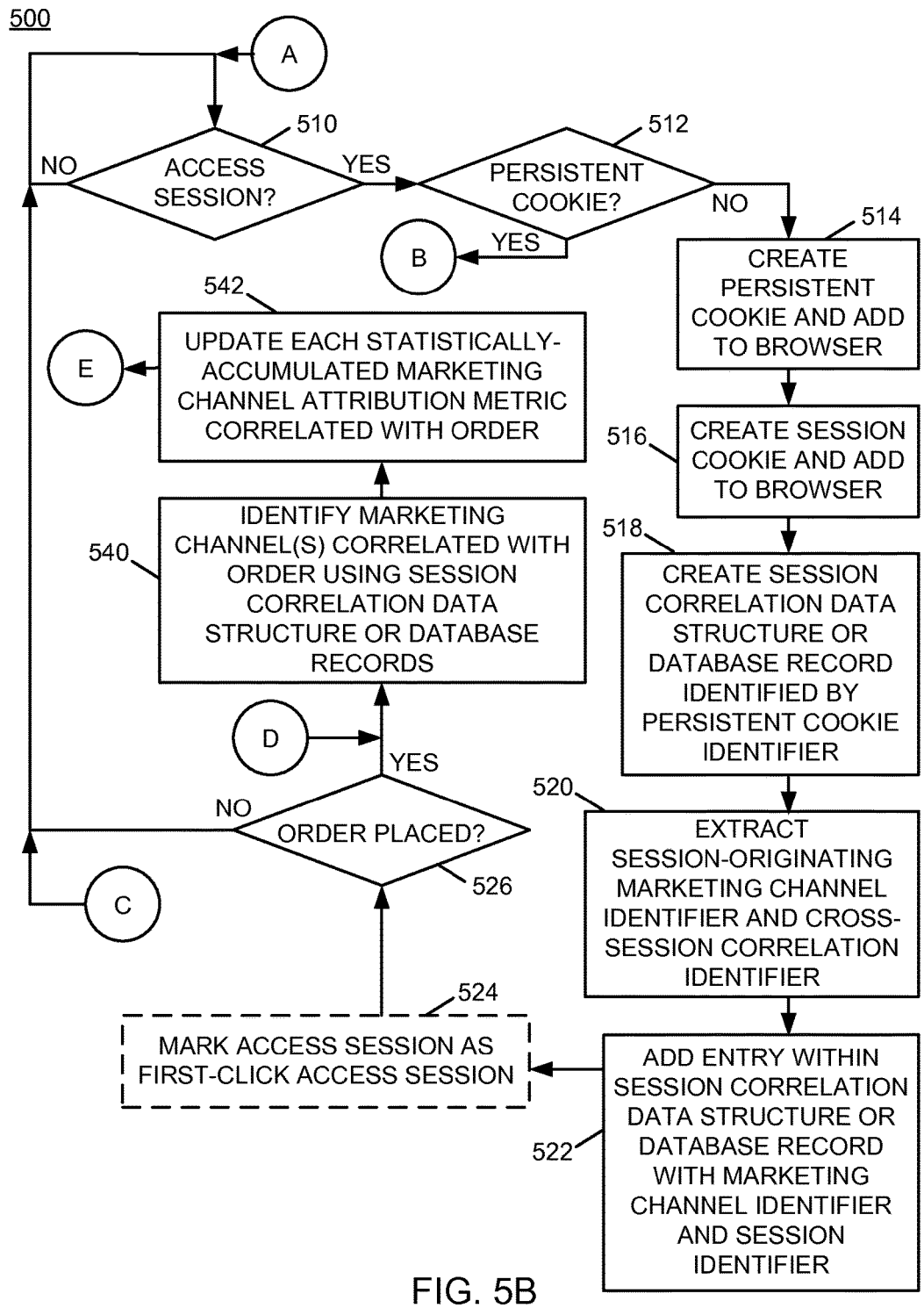
FIG. 5B is a flow chart of an example of an implementation of first portion of additional processing within a process for web access session correlation and marketing channel attribution for statistical marketing attribution correlation according to an embodiment of the present subject matter.
Figure 5C:
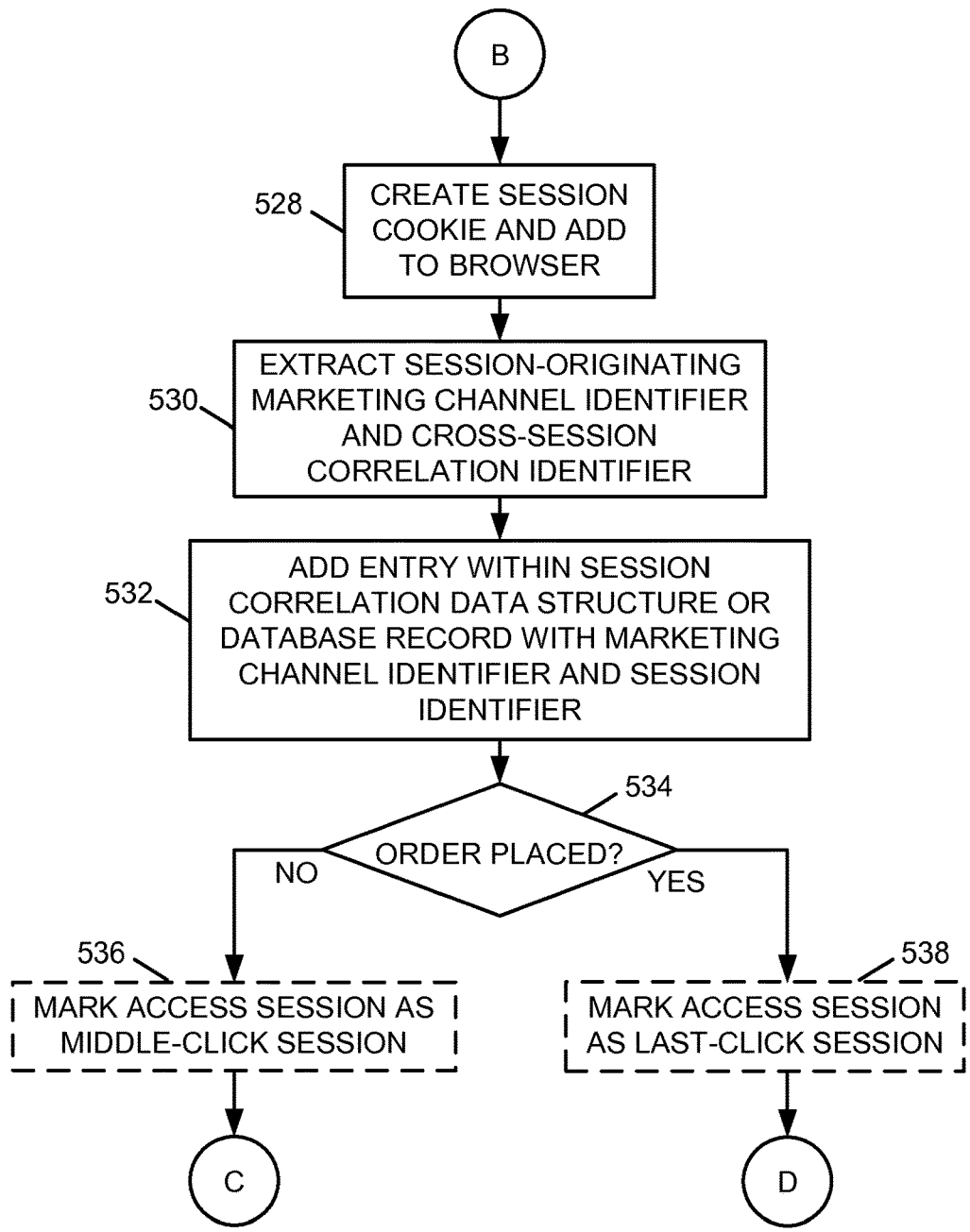
FIG. 5C is a flow chart of an example of an implementation of a second portion of additional processing within a process for web access session correlation and marketing channel attribution for statistical marketing attribution correlation according to an embodiment of the present subject matter.

FIGS. 5A-5C illustrate a flow chart of an example of an implementation of a process 500 for web access session correlation and marketing channel attribution for statistical marketing attribution correlation. FIG. 5A illustrates initial processing within the process 500. The process 500 may be utilized at a web sales-capable server to process web access sessions, accumulate statistics of marketing channel effectiveness/influence over time, and partition/distribute marketing perquisites (e.g., marketing credits, bonuses, or other incentives) to marketing channels based upon their statistically-accumulated effectiveness. The process 500 may be considered a multi-threaded process with a thread operative for each identified correlated set of web access sessions.

At decision point 502, the process 500 makes a determination as to whether to begin processing for sessions to accumulate and apply statistical marketing channel attribution metrics to marketing channels. It is understood that the iteration with respect to a negative determination at decision point 502 is illustrated for convenience of description and any suitable event may be utilized to initiate processing of the process 500 either as a stand-alone process or as a portion of another process.

In response to determining at decision point 502 to begin processing for sessions to accumulate and apply statistical marketing channel attribution metrics to marketing channels, the process 500 identifies all marketing channels used by the web sales-capable server at block 504. At block 506, the process 500 creates a statistical marketing attribution correlation model that includes a statistically-accumulated marketing channel attribution metric associated with each marketing channel used by the web sales-capable server. It should be noted that creation of the statistical marketing attribution correlation model may be performed independently of a process for accumulation of statistics within such a model and that the processing to create the statistical marketing attribution correlation model may be performed in any manner appropriate for a given implementation. Further, the statistically-accumulated marketing channel attribution metrics associated with each marketing channel used by the web sales-capable server may be created without aggregation within a model if appropriate for a given implementation.

At block 508, the process 500 begins processing of web access sessions and statistical accumulation of marketing channel attribution metrics within the statistical marketing attribution correlation model based upon orders that are received and processed. For example, a marketing channel correlation database record may be created for each web access session within a database, such as the session correlation database 212, in association with each web access session. To construct the marketing channel correlation database records, a session-originating web marketing channel identifier may be extracted from a web access link used by the consumer to initiate the web access session to access the web sales-capable server. Additionally, at least one cross-session correlation identifier (e.g., a persistent cookie ID, and a web access session ID including a session timestamp, etc.) may be extracted from session information associated with the web access session. The extracted session-originating web marketing channel identifier and the extracted at least one cross-session correlation identifier may be stored within the database as web marketing channel correlation information within the marketing channel correlation database record. The marketing channel correlation database records may then be processed as part of collective analytical processing to correlate the respective marketing channel correlation database records and attribute an accumulated statistical sales contribution of each marketing channel that originated one of a correlated set of web access sessions that are correlated with an order.

As described above, real-time processing for correlation of web access sessions may alternatively be performed as appropriate for a given implementation. A session correlation data structure, file, or other storage format may be created in association with a first-click web access session. This session correlation data structure, file, or other storage format may be updated in response to each web access session identified in real-time to be correlated with the respective session correlation storage format.

The processing for real-time correlation of web access sessions is illustrated in addition to the collective analytical processing within the portions of the process 500 shown within FIGS. 5B and 5C. It is understood that the alternative forms of processing for correlation may be performed as described above using the created marketing channel correlation database records as appropriate for a given implementation or the session correlation storage format. To begin accumulation of the marketing channel correlation database records, the process 500 transitions to the processing shown and described in association with FIG. 5B.

FIG. 5B illustrates a first portion of additional processing associated with the process 500 for web access session correlation and marketing channel attribution for statistical marketing attribution correlation. Higher-level iterative processing of web access sessions begins at decision point 510, where the process 500 makes a determination as to whether a web access session has been initiated by a consumer's browser/computing device. In response to determining that a web access session has been initiated by a consumer's browser/computing device, the process 500 makes a determination at decision point 512 as to whether a persistent cookie created by the web sales-capable server is associated with the browser used by the consumer to access the web sales-capable server. For purposes of the present example, persistent cookies are created in association with first-click web access sessions.

In response to determining at decision point 512 that a persistent cookie created by the web sales-capable server is not associated with the browser used by the consumer to access the web sales-capable server, the process 500 creates a persistent cookie (including a persistent cookie ID) and adds the persistent cookie created by the web sales-capable server to the browser to begin correlation of web access sessions by the consumer at block 514. It is understood that processing within the process 500 may split into a separate thread to begin correlating web access sessions associated with the created persistent cookie. Additional processing to terminate individual threads is not illustrated, but is understood to form a part of the process 500.

At block 516, the process 500 creates a session cookie and adds the session cookie to the browser used by the consumer to access the web sales-capable server. It is understood that a session cookie may be considered optional in view of the first session being associated with the persistent cookie, as appropriate for a given implementation.

At block 518, the process 500 creates, either within a browser used by the consumer to access the web sales-capable server in association with this first-click web access session, a session correlation data structure, file, or other storage format, or creates a marketing channel correlation database record (based upon the implementation options as described above) identified by the persistent cookie ID usable to correlate the web access sessions that originate from the browser used by the consumer. As such, the process 500 may associate the created session correlation data structure file, or other storage format with the browser used by the consumer using the persistent cookie.

At block 520, the process 500 extracts a session-originating web marketing channel identifier from a web access link used by the consumer to initiate the web access session to access the web sales-capable server, and extracts the at least one cross-session correlation identifier from session information associated with the web access session. At block 522, the process 500 adds an entry within the session correlation data structure, file, or other storage format, or the marketing channel correlation database record including the marketing channel identifier of the marketing channel that originated the web access session and the cross-session correlation identifier of the web access session. At block 524, as noted by the dashed-line representation, optionally if the process 500 is implemented to utilize the session correlation data structure and real-time correlation, the process 500 may mark the web access session as a first-click web access session within the session correlation data structure. As described above, the marking of correlated marketing channel correlation database records may be performed as part of collective analytical processing rather than processing in real time.

At decision point 526, the process 500 makes a determination as to whether an order is placed via the first-click web access session. In response to determining that an order is not placed via the first-click web access session, the process 500 returns to decision point 510 and iterates as described above to process either new web access or additional web access sessions associated with any persistent cookies that have already been created for previous first-click sessions.

Returning to the description of decision point 512, in response to a new web access session as determined at decision point 510, the process 500 again makes a determination as to whether a persistent cookie created by the web sales-capable server is associated with the browser used by the consumer to access the web sales-capable server. As described above, persistent cookies are created in association with first-click web access session. As such, where a persistent cookie already created by the web sales-capable server already exists in association with the browser used by the consumer to access the web sales-capable server, the new web session may be considered either a middle-click web access session or a last-click web access session.

In response to determining at decision point 512 that a persistent cookie created by the web sales-capable server is associated with the browser used by the consumer to access the web sales-capable server, the process 500 transitions to the processing shown and described in association with FIG. 5C.

FIG. 5C illustrates a second portion of additional processing associated with the process 500 for web access session correlation and marketing channel attribution for statistical marketing attribution correlation. At block 528, the process 500 creates a session cookie and adds the session cookie to the browser used by the consumer to access the web sales-capable server. At block 530, the process 500 extracts the session-originating web marketing channel identifier from a web access link used by the consumer to initiate the web access session to access the web sales-capable server, and extracts the at least one cross-session correlation identifier from session information associated with the web access session. At block 532, the process 500 adds an entry within the session correlation data structure, file, or other storage format, or the marketing channel correlation database record including the marketing channel identifier of the marketing channel that originated the web access session and the cross-session correlation identifier of the web access session. As such, the process 500 may correlate the web access session with at least one other web access session associated with the persistent cookie.

At decision point 534, the process 500 makes a determination as to whether an order is placed by the consumer during the current web access session. In response to determining that an order is not placed by the consumer during the current web access session, as noted by the dashed-line representation, if the process 500 is implemented to utilize the session correlation data structure and real-time correlation, the process 500 may mark the web access session as a middle-click web access session within the session correlation data structure, file, or other storage format at block 536. As described above, the marking of correlated marketing channel correlation database records may be performed as part of collective analytical processing rather than processing in real time. Alternatively, in response to determining that an order is placed by the consumer during the current web access session, again as noted by the dashed-line representation, if the process 500 is implemented to utilize the session correlation data structure and real-time correlation, the process 500 may mark the web access session as a last-click web access session within the session correlation data structure, file, or other storage format at block 538. Again, the marking of correlated marketing channel correlation database records may be performed as part of collective analytical processing rather than processing in real time.

In response to marking the current web access session as a middle-click web access session at block 536, the process 500 returns to the processing shown in FIG. 5B at decision point 510 and iterates as described above. In response to marking the current web access session as a last-click session at block 538, the process 500 also returns to the processing shown in FIG. 5B at block 540.

At block 540, in response to marking the current web access session as a last-click session at block 538, or, returning to the description of decision point 526, in response to determining that an order has been placed by the consumer via the web sales-capable server, the process 500 identifies each marketing channel correlated with the order using the session correlation data structure, file, or other storage format associated with the browser used by the consumer, or within the marketing channel correlation database records within a database (e.g., this may be performed in real-time for the database records or as part of collective analytical processing). At block 542, the process 500 updates, for each marketing channel correlated with the order, the associated statistically-accumulated marketing channel attribution metric of the marketing channel based upon the marketing channels correlated with the order. As such, the process 500 may update the respective statistically-accumulated marketing channel attribution metric associated with each correlated marketing channel prior to using those updated metrics to partition any perquisites to the respective marketing channels that contributed to the order. The process 500 returns to the processing described in association with FIG. 5A to apply the updated metrics.

At decision point 544, the process 500 makes a determination as to whether to defer processing of the order and post-process the order with other orders as part of a collective analytical processing cycle to update the statistical marketing attribution model and determine marketing influence for the order, or whether to process the order in real time. In response to determining to defer processing of the order, the process 500 returns to the processing described in association with FIGS. 5B and 5C to process additional web access sessions and orders.

Alternatively, in response to determining during any iteration of the process 500 at decision point 544 not to defer processing and to process the order, either individually or with one or more other orders as part of a collective analytical processing cycle, at block 546, the process 500 applies the marketing channels that are correlated with the order to the updated statistically-accumulated marketing channel attribution metrics associated with each correlated marketing channel. The marketing channels that are correlated with the order may be identified either using a session correlation data structure, file, or other storage format, or by use of marketing channel correlation database records within the respective session correlation database. For a session correlation data structure, file, or other storage format implementation, the process 500 may extract the web marketing channel correlation information from the respective session correlation storage format. The extracted web marketing channel correlation information may be applied to a statistical marketing attribution correlation model including the statistically-accumulated marketing channel attribution metric associated with each correlated marketing channel correlation database record.

For a marketing channel correlation database record implementation, the process 500 may parse each marketing channel correlation database record within the database and identify marketing channel correlation database records that include an identical cross-session correlation identifier that is correlated with the order. The identified marketing channel correlation database records that include the identical cross-session correlation identifier may be correlated as representing the set of web access sessions that are correlated with the order. The correlated marketing channel correlation database records may be applied to a statistical marketing attribution correlation model including the statistically-accumulated marketing channel attribution metric associated with each correlated marketing channel correlation database record.

At block 548, the process 500 determines a sales influence contribution associated with the order of each marketing channel correlated with the processed order. For example, the process 500 may determine a sales influence contribution associated with the marketing channel associated with the first-click web access session correlated with the order, may determine a sales influence contribution associated with the marketing channel associated with each middle-click web access session correlated with the order, and may determine a sales influence contribution associated with the marketing channel associated with the last-click web access session correlated with the order.

At block 550, the process 500 identifies the accumulated statistical sales contribution of each marketing channel correlated with the order using the updated statistically-accumulated marketing channel attribution metric associated with each correlated marketing channel. At block 552, the process 500 assigns a prorated proportion of available marketing perquisites generated by the order to each marketing channel that originated the correlated set of web access sessions that are correlated with the order based upon the calculated accumulated statistical sales contribution of each marketing channel. The process 500 returns to block 508 to continue processing of web access sessions as described above.

As such, the process 500 may create a statistically-accumulated marketing channel attribution metric associated with each marketing channel used by a web sales-capable server, and may correlate the created metrics within a statistical marketing attribution correlation model. The process 500 processes web access sessions to identify and correlate a first-click web access session with one or more of a middle-click and/or last-click web access session, as appropriate for the given set of correlated web access sessions. The process 500 identifies orders that are placed and updates the marketing channel attribution metrics associated with the marketing channels correlated with the order to statistically accumulate the effectiveness/influence of the respective marketing channels. The process 500 utilizes the updated statistically-accumulated marketing channel attribution metrics to identify an accumulated sales contribution of each marketing channel correlated with the order, and assigns a prorated proportion of available marketing perquisites generated by the order to each marketing channel that originated the correlated set of web access sessions that are correlated with the order based upon the calculated accumulated statistical sales contribution of each marketing channel.

As described above in association with FIG. 1 through FIG. 5C, the example systems and processes provide statistical marketing attribution correlation. Many other variations and additional activities associated with statistical marketing attribution correlation are possible and all are considered within the scope of the present subject matter.

Those skilled in the art will recognize, upon consideration of the above teachings, that certain of the above examples are based upon use of a programmed processor, such as the CPU 302. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
a communication interface; and
a network analytics processor programmed to:
improve computer detection of different server access channels that originate a plurality of web access sessions at different times with different servers that do not result during the respective web access sessions in placement of an order for a particular Internet-advertised product or service, where the different server access channels are selected from a group consisting of a manufacturer's server access channel, an email-based promotional campaign server access channel, a manufacturer affiliate's server access channel, a coupon distribution server access channel, and a pay-per-click advertising server access channel; and
where the improved computer detection of the different server access channels that do not result during the respective web access sessions in the placement of the order for the particular Internet-advertised product or service comprises the network analytics processor being programmed, responsive to detecting a first web access session originated by a consumer device using a first server access channel to access information related to the particular Internet-advertised product or service, to iterate until the order is placed to:
deploy, in association with each of the plurality of web access sessions initiated by the consumer device to access additional information related to the particular Internet-advertised product or service, a distinct session cookie that uniquely identifies session information comprising (i) a session identifier of the web access session, and (ii) a session-originating server access channel identifier of the server access channel that originated the web access session; and
capture, via the communication interface, integrated server access channel correlation information across the plurality of web access sessions comprising the session information identified within each distinct session cookie that documents each of the plurality of web access sessions with the different servers that do not result during the respective web access sessions in the placement of the order and that are originated at the different times by the consumer device using the different server access channels;
where the network analytics processor is further programmed, in response to the consumer device placing the order for the particular Internet-advertised product or service via a web sales-capable server, to:
update server access channel information, based upon the captured integrated server access channel correlation information, comprising updating a respective one of a first server access channel accumulated statistical historical effectiveness metric of the first server access channel that originated the first web access session that did not result during the first web access session in the placement of the order, a middle server access channel accumulated statistical historical effectiveness metric of each middle server access channel that originated each middle web access session that did not result during the middle web access sessions in the placement of the order, and a last server access channel accumulated statistical historical effectiveness metric of a last server access channel that originated a last web access session that did result during the last web access sessions in the placement of the order, where the detection of the different server access channels that did not result during the respective web access sessions in the placement of the order is improved.

2. The system of claim 1, further comprising a database, and where in being programmed to capture, via the communication interface, the integrated server access channel correlation information across the plurality of web access sessions, the network analytics processor is programmed to:
for each web access session:
extract the session-originating server access channel identifier from a web access link used to initiate the web access session;
extract at least one cross-session correlation identifier from session information associated with the web access session; and
store the extracted session-originating server access channel identifier and the extracted at least one cross-session correlation identifier within the integrated server access channel correlation information within a server access channel correlation database record within the database.

3. The system of claim 2, where, in being programmed to update the server access channel information, the network analytics processor is programmed to:
parse each server access channel correlation database record within the database;
identify server access channel correlation database records that comprise identical ones of the at least one cross-session correlation identifier;
correlate the identified server access channel correlation database records that comprise the identical ones of the at least one cross-session correlation identifier as representing the plurality of web access sessions; and
apply the correlated server access channel correlation database records to a statistical server access attribution correlation model comprising the respective one of the first server access channel accumulated statistical historical effectiveness metric, the middle server access channel accumulated statistical historical effectiveness metric, and the last server access channel accumulated statistical historical effectiveness metric.

4. The system of claim 1, further comprising a memory, and where, in being programmed to capture, via the communication interface, the integrated server access channel correlation information across the plurality of web access sessions, the network analytics processor is programmed to:
create, within the memory in association with the first web access session, a multi-session correlation data structure usable to correlate different web access sessions that originate from a browser used by the consumer device;
associate the created multi-session correlation data structure with the browser using at least one cross-session correlation identifier; and
add, for each web access session that originates from the browser, an entry within the multi-session correlation data structure comprising the session-originating server access channel identifier of the server access channel that originated the respective web access session and the session identifier of the web access session.

5. The system of claim 4, where the network analytics processor is further programmed to identify, in association with the order placed by the consumer device via the web sales-capable server, each server access channel that was not used during the placement of the order using the multi-session correlation data structure associated with the browser.

6. The system of claim 1, where the network analytics processor is further programmed to:
assign a prorated portion of revenues generated by the order to each server access channel that did not result during the respective web access sessions in the placement of the order according to values of each of the respective associated first server access channel accumulated statistical historical effectiveness metric, and the respective associated middle server access channel accumulated statistical historical effectiveness metric.

7. The system of claim 1, where the network analytics processor is further programmed to:
create a statistical server access attribution correlation model comprising the respective first server access channel accumulated statistical historical effectiveness metric, the middle server access channel accumulated statistical historical effectiveness metric, and the last server access channel accumulated statistical historical effectiveness metric;
apply correlated server access channels to the statistical server access attribution correlation model; and
identify a historically-accumulated effectiveness of each server access channel that did not result during the respective web access sessions in the placement of the order based upon the correlated server access channels as applied to the statistical server access attribution correlation model.

8. The system of claim 1, where the network analytics processor is further programmed to:
determine a historically-accumulated effectiveness associated with each of:
the first server access channel that originated the first web access session that did not result during the first web access session in the placement of the order according to a value of the associated first server access channel accumulated statistical historical effectiveness metric;
each middle server access channel that originated each middle web access session that did not result during the respective middle web access session in the placement of the order according to a value of the associated middle server access channel accumulated statistical historical effectiveness metric; and
the last server access channel that originated the last web access session during which the order was placed according to a value of the associated last server access channel accumulated statistical historical effectiveness metric.

9. A computer program product, comprising:
a computer readable storage medium having computer readable program code embodied therewith, where the computer readable storage medium is not a transitory signal per se and where the computer readable program code when executed on a network analytics computer causes the network analytics computer to:
improve computer detection of different server access channels that originate a plurality of web access sessions at different times with different servers that do not result during the respective web access sessions in placement of an order for a particular Internet-advertised product or service, where the different server access channels are selected from a group consisting of a manufacturer's server access channel, an email-based promotional campaign server access channel, a manufacturer affiliate's server access channel, a coupon distribution server access channel, and a pay-per-click advertising server access channel; and where the improved computer detection of the different server access channels that do not result during the respective web access sessions in the placement of the order for the particular Internet-advertised product or service comprises the computer readable program code when executed on the network analytics computer causing the network analytics computer, responsive to detecting a first web access session originated by a consumer device using a first server access channel to access information related to the particular Internet-advertised product or service, to iterate until the order is placed to:

deploy, in association with each of the plurality of web access sessions initiated by the consumer device to access additional information related to the particular Internet-advertised product or service, a distinct session cookie that uniquely identifies session information comprising (i) a session identifier of the web access session, and (ii) a session-originating server access channel identifier of the server access channel that originated the web access session; and capture integrated server access channel correlation information across the plurality of web access sessions comprising the session information identified within each distinct session cookie that documents each of the plurality of web access sessions with the different servers that do not result during the respective web access sessions in the placement of the order and that are originated at the different times by the consumer device using the different server access channels;

where the computer readable program code when executed on the network analytics computer further causes the network analytics computer, in response to the consumer device placing the order for the particular Internet-advertised product or service via a web sales-capable server, to:

update server access channel information, based upon the captured integrated server access channel correlation information, comprising updating a respective one of a first server access channel accumulated statistical historical effectiveness metric of the first server access channel that originated the first web access session that did not result during the first web access session in the placement of the order, a middle server access channel accumulated statistical historical effectiveness metric of each middle server access channel that originated each middle web access session that did not result during the middle web access sessions in the placement of the order, and a last server access channel accumulated statistical historical effectiveness metric of a last server access channel that originated a last web access session that did result during the last web access session in the placement of the order, where the detection of the different server access channels that did not result during the respective web access sessions in the placement of the order is improved.

10. The computer program product of claim 9, where, in causing the network analytics computer to capture the integrated server access channel correlation information across the plurality of web access sessions, the computer readable program code when executed on the network analytics computer causes the network analytics computer to:

for each web access session:
    extract the session-originating server access channel identifier from a web access link used to initiate the web access session;
    extract at least one cross-session correlation identifier from session information associated with the web access session; and
    store the extracted session-originating server access channel identifier and the extracted at least one cross-session correlation identifier within the integrated server access channel correlation information within a server access channel correlation database record within a database.

11. The computer program product of claim 10, where, in causing the network analytics computer to update the server access channel information, the computer readable program code when executed on the network analytics computer causes the network analytics computer to:

parse each server access channel correlation database record within the database;
identify server access channel correlation database records that comprise identical ones of the at least one cross-session correlation identifier;
correlate the identified server access channel correlation database records that comprise the identical ones of the at least one cross-session correlation identifier as representing the plurality of web access sessions; and
apply the correlated server access channel correlation database records to a statistical server access attribution correlation model comprising the respective one of the first server access channel accumulated statistical historical effectiveness metric, the middle server access channel accumulated statistical historical effectiveness metric, and the last server access channel accumulated statistical historical effectiveness metric.

12. The computer program product of claim 9, where, in causing the network analytics computer to capture the integrated server access channel correlation information across the plurality of web access sessions, the computer readable program code when executed on the network analytics computer causes the network analytics computer to:

create, within a memory in association with the first web access session, a multi-session correlation data structure usable to correlate different web access sessions that originate from a browser used by the consumer device;
associate the created multi-session correlation data structure with the browser using at least one cross-session correlation identifier; and
add, for each web access session that originates from the browser, an entry within the multi-session correlation data structure comprising the session-originating server access channel identifier of the server access channel that originated the respective web access session and the session identifier of the web access session.

13. The computer program product of claim 12, where the computer readable program code when executed on the network analytics computer further causes the network analytics computer to identify, in association with the order placed by the consumer device via the web sales-capable server, each server access channel that was not used during the placement of the order using the multi-session correlation data structure associated with the browser.

14. The computer program product of claim 9, where the computer readable program code when executed on the network analytics computer further causes the network analytics computer to:
assign a prorated portion of revenues generated by the order to each server access channel that did not result during the respective web access sessions in the placement of the order according to values of each of the respective associated first server access channel accumulated statistical historical effectiveness metric, and the respective associated middle server access channel accumulated statistical historical effectiveness metric.

15. The computer program product of claim 9, where the computer readable program code when executed on the network analytics computer further causes the network analytics computer to:
create a statistical server access attribution correlation model comprising the respective first server access channel accumulated statistical historical effectiveness metric, the middle server access channel accumulated statistical historical effectiveness metric, and the last server access channel accumulated statistical historical effectiveness metric;
apply correlated server access channels to the statistical server access attribution correlation model; and
identify a historically-accumulated effectiveness of each server access channel that did not result during the respective web access sessions in the placement of the order based upon the correlated server access channels as applied to the statistical server access attribution correlation model.

16. The computer program product of claim 9, where the computer readable program code when executed on the network analytics computer further causes the network analytics computer to:
determine a historically-accumulated effectiveness associated with each of:
the first server access channel that originated the first web access session that did not result during the first web access session in the placement of the order according to a value of the associated first server access channel accumulated statistical historical effectiveness metric;
each middle server access channel that originated each middle web access session that did not result during the respective middle web access session in the placement of the order according to a value of the associated middle server access channel accumulated statistical historical effectiveness metric; and
the last server access that originated the last web access session during which the order was placed according to a value of the associated last server access channel accumulated statistical historical effectiveness metric.

* * * * *